US008601320B2

(12) United States Patent
Li et al.

(10) Patent No.: US 8,601,320 B2
(45) Date of Patent: Dec. 3, 2013

(54) METHOD AND SYSTEM FOR EXPANDING MICRO TELECOM COMPUTING ARCHITECTURE

(75) Inventors: Shanfu Li, Shenzhen (CN); Feng Hong, Shenzhen (CN); Cheng Chen, Shenzhen (CN); Longji Rao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 791 days.

(21) Appl. No.: 12/813,368

(22) Filed: Jun. 10, 2010

(65) Prior Publication Data

US 2010/0251021 A1 Sep. 30, 2010

Related U.S. Application Data

(63) Continuation of application No. PCT/CN2008/072771, filed on Oct. 21, 2008.

(30) Foreign Application Priority Data

Dec. 10, 2007 (CN) .......................... 2007 1 0195339

(51) Int. Cl.
*G06F 11/00* (2006.01)
(52) U.S. Cl.
USPC ............................................ 714/27; 710/301
(58) Field of Classification Search
USPC ....................................................... 714/27
See application file for complete search history.

(56) References Cited

U.S. PATENT DOCUMENTS

| 7,083,422 | B2 |   | 8/2006 | Campini et al. | |
|---|---|---|---|---|---|
| 7,631,133 | B2 | * | 12/2009 | Fallah-Adl et al. | 710/301 |
| 8,041,996 | B2 | * | 10/2011 | Rathunde et al. | 714/26 |
| 8,225,116 | B2 | * | 7/2012 | Chen et al. | 713/310 |
| 2005/0227505 | A1 | * | 10/2005 | Campini et al. | 439/61 |
| 2006/0206647 | A1 | * | 9/2006 | Stahl et al. | 710/301 |
| 2007/0124529 | A1 | * | 5/2007 | Carr et al. | 710/317 |
| 2007/0233927 | A1 | * | 10/2007 | Fallah-Adl et al. | 710/301 |
| 2008/0010525 | A1 | * | 1/2008 | Halliday et al. | 714/30 |
| 2008/0052436 | A1 | * | 2/2008 | Sharma et al. | 710/301 |
| 2009/0073669 | A1 | * | 3/2009 | Hong et al. | 361/788 |
| 2009/0183023 | A1 | * | 7/2009 | Rathunde et al. | 714/4 |
| 2010/0005333 | A1 | * | 1/2010 | Li et al. | 713/400 |
| 2010/0251021 | A1 | * | 9/2010 | Li et al. | 714/27 |

FOREIGN PATENT DOCUMENTS

| CN | 1949723 A | 4/2007 |
|---|---|---|
| CN | 200976036 Y | 11/2007 |
| CN | 101247534 A | 8/2008 |
| WO | WO 2007/112109 A2 | 10/2007 |

OTHER PUBLICATIONS

Translation of Office Action dated Jan. 21, 2011 in connection with Chinese Patent Application No. 200710195339.1.

(Continued)

*Primary Examiner* — Kamini Patel

(57) ABSTRACT

A method and a micro telecom computing architecture (MicroTCA) system for expanding MicroTCA are provided. On a backplane of a MicroTCA system, an advanced mezzanine card (AMC) connector and a joint test action group (JTAG) testing unit connector are set into at least one AMC slot. Setting the JTAG testing unit connector by using the existing AMC slot prevents occupying exclusive backplane space by setting another JTAG slot, and thus saves backplane space. Furthermore, after the test is completed, an AMC can be plugged in and the normal use of the AMC is not affected.

16 Claims, 7 Drawing Sheets

(56) References Cited

OTHER PUBLICATIONS

Written Opinion of the International Searching Authority dated Feb. 5, 2009 in connection with International Patent Application No. PCT/CN2008/072771.

Partial Translation of Office Action dated May 21, 2010 in connection with Chinese Patent Application No. 200710195339.1.
"Micro Telecommunications Computing Architecture Short Form Specification", MicroTCA, Sep. 21, 2006, 34 pages.
International Search Report issued Feb. 5, 2009 in connection with International Patent Application No. PCT/CN2008/072771.

* cited by examiner

METHOD AND SYSTEM FOR EXPANDING
MICRO TELECOM COMPUTING
ARCHITECTURE

CROSS-REFERENCE TO RELATED APPLICATIONS

This application is a continuation of International Application No. PCT/CN2008/072771, filed on Oct. 21, 2008, which claims priority to Chinese Patent Application No. 200710195339.1, filed on Dec. 10, 2007, both of which are hereby incorporated by reference in their entireties.

TECHNICAL FIELD

The present invention relates to the field of communications, and more particularly to a method and a system for expanding micro telecom computing architecture (MicroTCA).

BACKGROUND

The MicroTCA is a platform specification formulated by the peripheral component interconnect (PCI) industrial computer manufacturers group (PICMG). The MicroTCA adopts advanced mezzanine cards (AMCs) to construct a modular communication platform with a small capacity and a low cost, which is mainly applied to small-scale telecom equipment or enterprise-level communication equipment such as a central office. Currently, the standard specification version is PICMG MicroTCA.0 R1.0.

The MicroTCA may be set to various product forms. According to requirements of different services, a MicroTCA system may be configured with different MicroTCA Carrier Hubs (MCHs) and different amount of AMCs with different sizes. The MicroTCA system is applicable to a cabinet with a depth of 300 mm, and is also suitable for being placed in a cabinet with a depth of 600 mm in a back-to-back installation manner.

As shown in FIG. 1, main functional modules of a MicroTCA system include: a chassis, power modules (PMs), MCHs, and AMCs. A backplane in the chassis is connected to the MCHs, the AMCs, and the PMs. The MCHs, the AMCs, and the PMs are connected and exchange data with one another via circuits in the backplane. The MCH is a central module of the MicroTCA system, and provides management, exchanging, clock, and test functions for the MicroTCA system.

In addition, the MicroTCA system further includes a joint test action group (JTAG) testing unit. The JTAG is an international standard test protocol, and is mainly applied to interconnection tests in the MicroTCA system, for example, a data connection failure test between cards, or an interconnection failure between chips. The JTAG is capable of testing data connection and clock connection in the MicroTCA system. The JTAG testing unit set in the MicroTCA system provides a testing port connected to a to-be-tested unit in the system. A main element of the JTAG testing unit is a JTAG switch module (JSM) Generally, the JTAG testing unit is realized by plugging a JSM into a JTAG slot, and the JTAG slot provides a JTAG testing unit connector. The JTAG testing unit connector is provided with connecting ports connected to the to-be-tested unit and the JTAG control unit, and a connecting port connected to a load power. The connection relationships are shown in FIG. 2. The connections among the JSM, the JTAG control unit, and the to-be-tested units adopt a star topology structure, in which the JTAG control unit may be set in the MCH, and may also be realized by an external test tool; and the to-be-tested units are generally AMCs.

FIG. 3 is a functional block diagram of a JSM. As shown in FIG. 3, the JSM mainly includes a primary switch module, a port switch module, and a power supply module. The primary switch module is configured to be connected to the connecting port on the JTAG testing unit connector for being connected to the JTAG control unit, and connected to the MCHs or an external test tool. The port switch module is configured to be connected to the connecting port on the JTAG testing unit connector for being connected to the to-be-tested units, and connected to the AMCs. The power supply module is configured to be connected to the connecting port on the JTAG testing unit connector for supplying the load power, to supply a load power for the JTAG testing unit. Ports connected to the AMCs include: a test data output (TDO) port, configured to output data of the JSM to the AMCs; a test data input (TDI) port, configured to input the AMC data into the JSM; a test clock input (TCK) port, configured to input a test clock; a test mode select (TMS) port, configured to set a JTAG port in a certain specific test mode; and a test reset (TRST) port, configured to reset the test, which is activated under a low level. The connection of the MCHs and JSM has already been defined in the MicroTCA.0R1.0.

During the implementation of the present invention, the inventor finds that the prior art at least has the following problems.

In the prior art, generally, a JTAG slot is additionally disposed on a backplane, and occupies exclusive backplane space. However, the JTAG slot is merely provided for the JSM to be plugged therein for testing the product in the production process before the MicroTCA system leaves the factory, and then the JTAG slot is in an idle state after the MicroTCA system leaves the factory. Furthermore, slots for other units of the MicroTCA system need to be provided on the backplane of the MicroTCA system, and the backplane space is rather limited. In addition, the additionally set JTAG slot occupies exclusive backplane space, which apparently causes waste of the backplane space.

SUMMARY

Accordingly, the present invention is directed to a method and a system for expanding a MicroTCA, which further save backplane space.

The present invention provides a method for expanding a MicroTCA, which includes the following steps.

An AMC connector and a JTAG testing unit connector are set into at least one AMC slot on a backplane of a MicroTCA system.

The present invention further provides a MicroTCA system, which includes at least one AMC slot on a backplane, and an AMC connector and a JTAG testing unit connector is set in the at least one AMC slot.

In the method and system provided according to the embodiments of the present invention, an AMC connector and a JTAG testing unit connector are set into at least one AMC slot on a backplane of a MicroTCA system. Setting the JTAG testing unit connector by using the existing AMC slot prevents occupying exclusive backplane space by setting another JTAG slot, and thus saves backplane space. Furthermore, after the test is completed, an AMC can be plugged in and the normal use of the AMC is not affected.

DETAILED DESCRIPTION

To make the objectives, technical solutions, and advantages of the present invention more comprehensible, the present invention is described below with reference to the accompanying drawings and specific embodiments.

In a method provided according to an embodiment of the present invention, an AMC connector and a JTAG testing unit connector are set into at least one AMC slot on a backplane of a MicroTCA system.

The JTAG testing unit connector may be set in an area outside the AMC connector in the AMC slot.

Figure 4A:
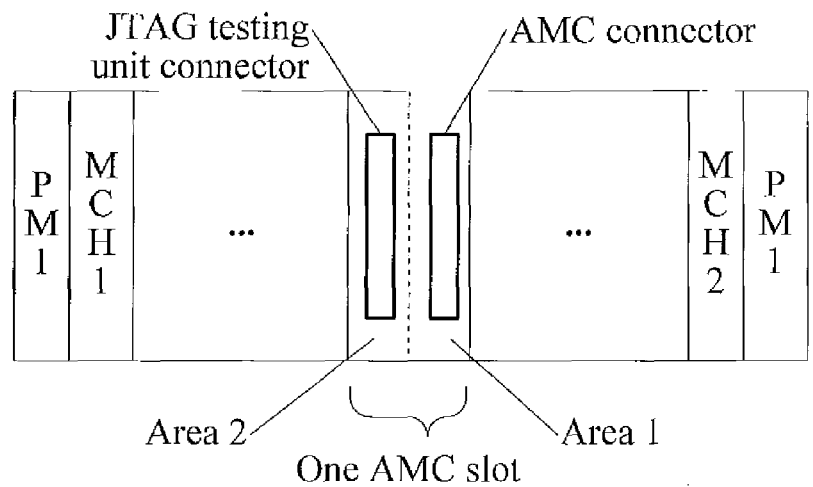
FIG. 4a is a distribution diagram of a slot area of a full-height single-width AMC according to an embodiment of the present invention.
Figure 4B:
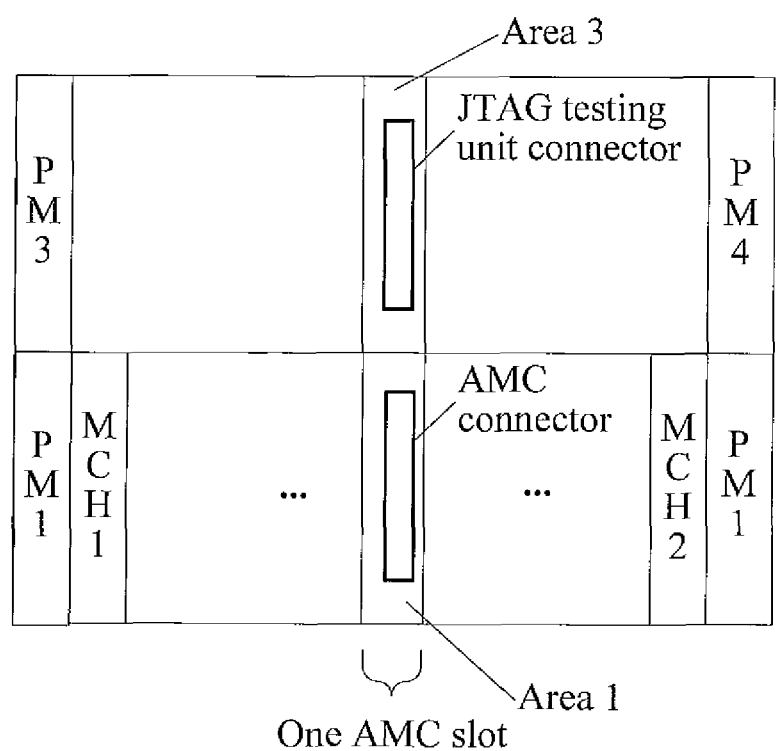
FIG. 4b is a distribution diagram of a slot area of a half-height double-width AMC according to an embodiment of the present invention.
Figure 4C:
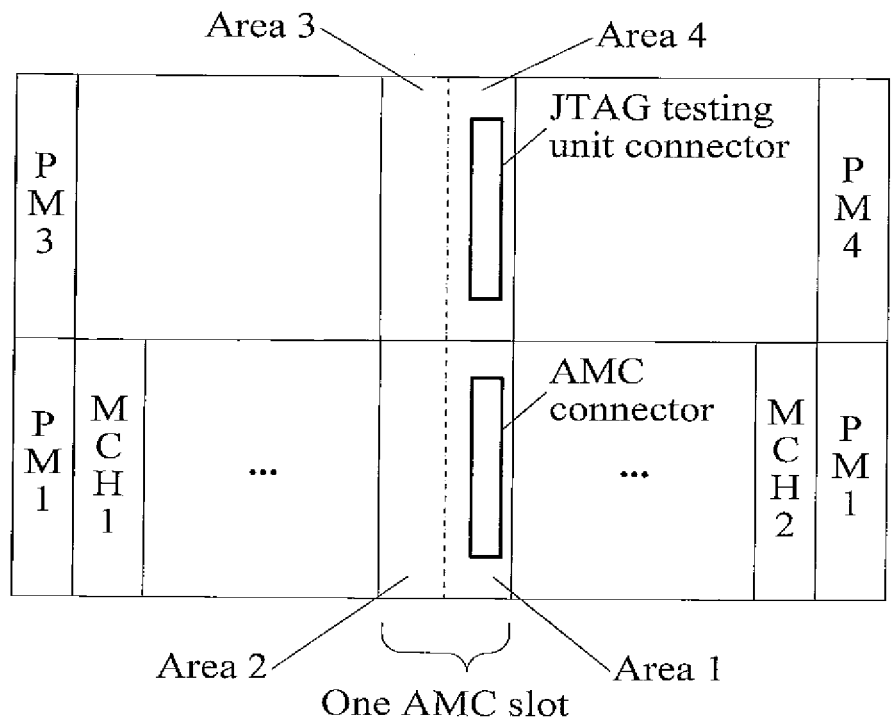
FIG. 4c is a distribution diagram of a slot area of a full-height double-width AMC according to an embodiment of the present invention.

The AMCs in the MicroTCA system may be set to different specifications according to actual requirements. The AMCs may be classified into double-width AMCs and single-width AMCs, in which a single-layer AMC is referred to as a single-width AMC, and a double-layer AMC is referred to as a double-width AMC. The AMCs may be further classified into full-height AMCs and half-height AMCs, in which a full-height AMC generally has a height of 6 HP, and 1 HP is equivalent to 0.2 inch, and a half-height AMC generally has a height of 3 HP. One full-height AMC slot is provided for plugging two half-height AMCs. FIG. 4a is a distribution diagram of a slot area of a full-height single-width AMC, FIG. 4b is a distribution diagram of a slot area of a half-height double-width AMC, and FIG. 4c is a distribution diagram of a slot area of a full-height double-width AMC. Generally, in an AMC slot, an AMC connector occupies one area, and the other areas are in an idle state, so that the idle areas in the AMC slot may be used for setting a JTAG testing unit connector. As shown in FIG. 4a, generally, an AMC connector is set in an area 1, and the JTAG testing unit connector is set in an area 2 of the full-height single-width AMC slot. As shown in FIG. 4b, the AMC connector is set in the area 1, and the JTAG testing unit connector is set in an area 3 of the half-height double-width AMC. As shown in FIG. 4c, the AMC connector is set in the area 1, and the JTAG testing unit connector is set in an area 4 of the full-height double-width AMC, or set in an area 2 or an area 3 thereof. It should be noted that the JTAG testing unit connector may be set into any AMC slot.

Figure 5:
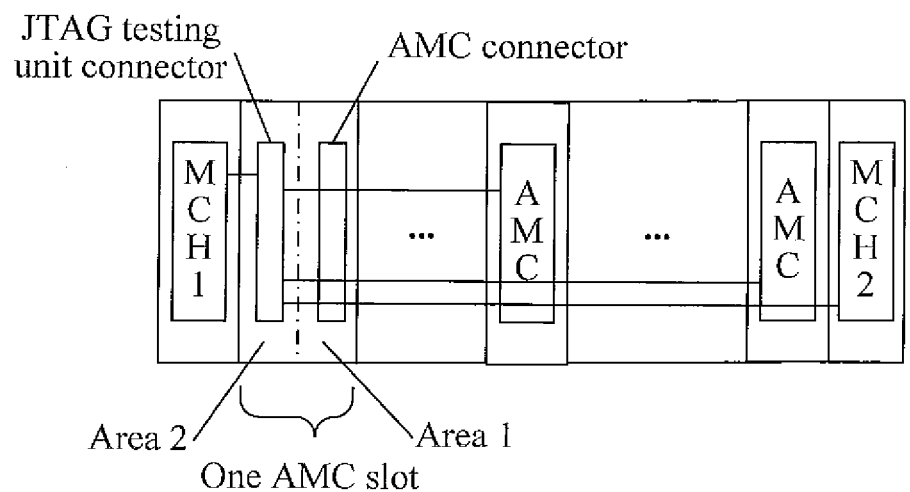
FIG. 5 is a connection relationship diagram of a JTAG testing unit connector according to an embodiment of the present invention.

The configuration of the JTAG testing unit connector is described below in detail through an embodiment. FIG. 5 is a connection relationship diagram of a JTAG testing unit connector according to an embodiment of the present invention. As shown in FIG. 5, a JTAG testing unit connector is set in an area 2 of a full-height single-width AMC of a MicroTCA system, and the JTAG testing unit connector provides a star topological connection to the AMCs and the MCHs in the MicroTCA system. That is, the connection wiring between units of the backplane is in a star topology manner. Once a JSM is plugged, the JSM is located on a central node of the star topological connection.

FIG. 5 adopts active/standby redundant MCHs, that is, adopts two MCHs, namely, an MCH 1 and an MCH 2. Thus, a JTAG control unit for controlling a JTAG testing unit may be set in an MCH, or a controlling function of the JTAG control unit may be realized through an external test tool. In FIG. 5, a JTAG control unit is set in an MCH, to realize the management and control on the JTAG test for the system through the MCH, and to realize the testing and software loading for the AMCs in the system. Alternatively, the testing and loading functions may be realized through an external test tool.

Figure 1:
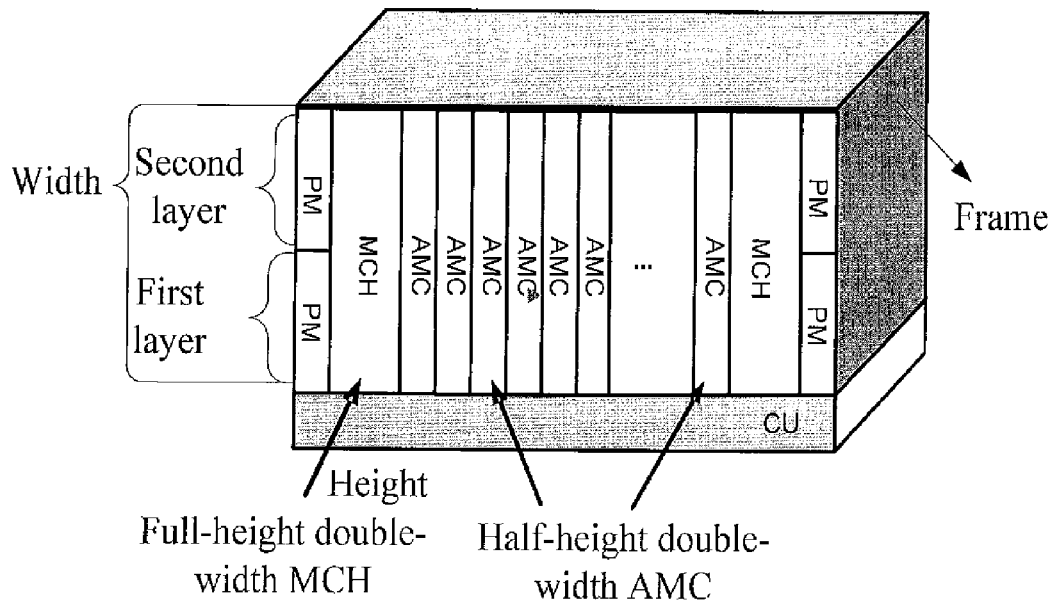
FIG. 1 is a structural block diagram of a MicroTCA system in the prior art.
Figure 2:
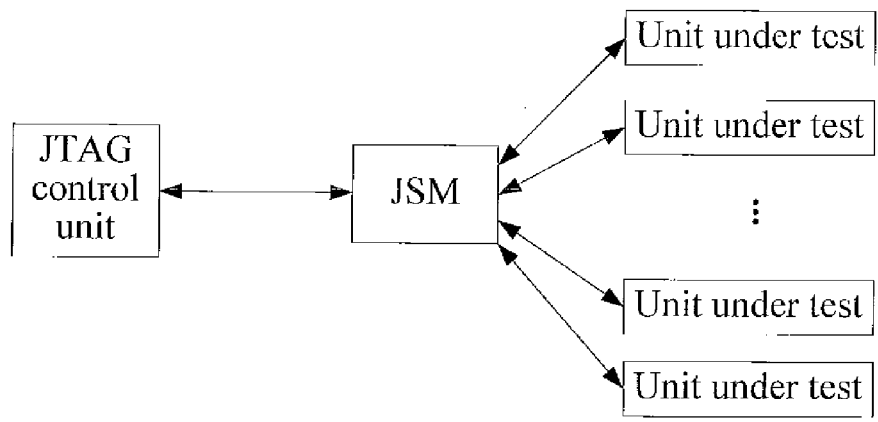
FIG. 2 is a connection topological view of a JTAG testing unit in the prior art.
Figure 3:
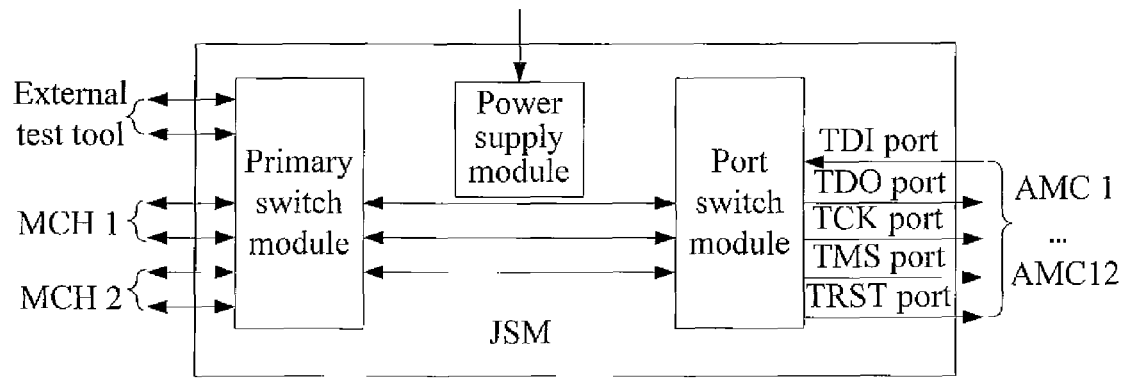
FIG. 3 is a block diagram of functions of a JSM in the prior art.

As shown in FIG. 3, the MCHs exchange information with a port switch module through a primary switch module of a JSM, and the port switch module of the JSM is connected to each AMC via a TDO port, a TDI port, a TCK port, a TMS port, and a TRST port. Each port of the JSM connector provides connections to the MCHs and the AMCs in a star-shaped manner The load power connection provided by the JSM connector may be directly supplied by a load power connection for the MCHs. That is, when the PM powers on the MCHs, the load power connection provided for the MCHs is used to power on the JSM at the same time. Alternatively, the PM may directly power on the JSM. Because the JSM does not require a power management, no power management connection is required on the JTAG testing unit connector.

When the JTAG test is performed on the MicroTCA system, a JSM is plugged into the above expanded AMC slot to perform system test and software loading. When the JTAG test is completed, the JSM is removed, and the expanded AMC slot may be provided for plugging an AMC therein, which does not affect the AMC slot.

Figure 6:
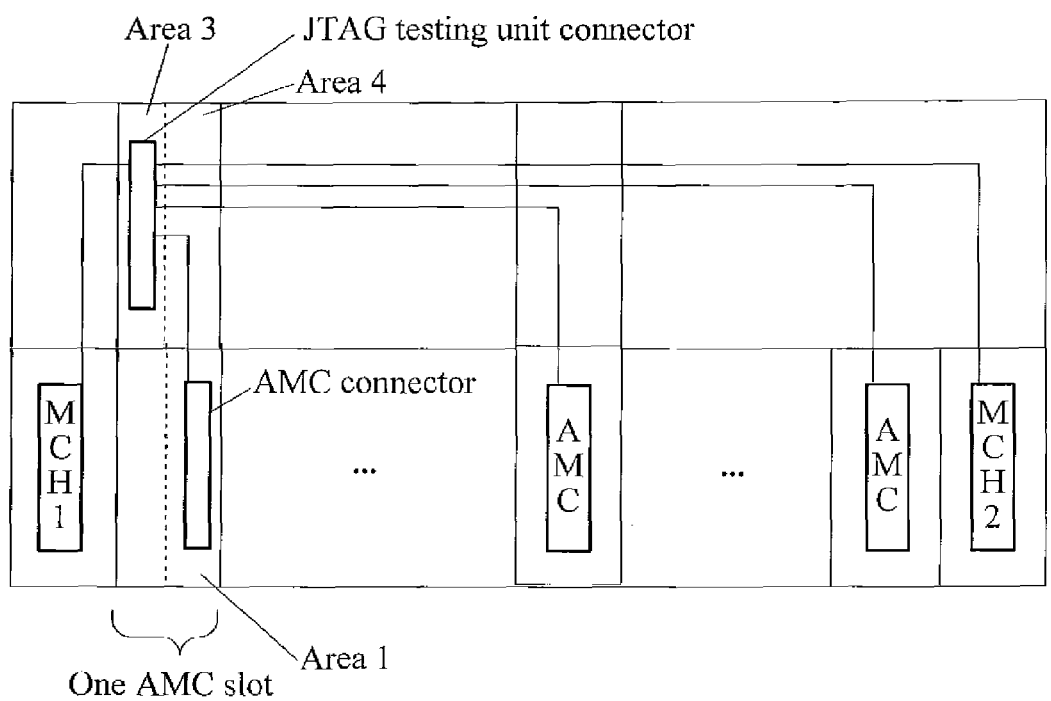
FIG. 6 is a connection relationship diagram of setting a JTAG testing unit slot in a full-height double-width AMC slot according to an embodiment of the present invention.

A full-height single-width AMC is taken as an example in the description of FIG. 5, and the connections provided by a JTAG testing unit connector set in AMCs with other specifications may also adopt the above manner. For example, FIG. 6 is a connection relationship diagram of setting a JTAG testing unit slot in a full-height double-width AMC slot according to an embodiment of the present invention. The JTAG testing unit connector is set in an area 3 of the full-height double-width AMC slot, and the JTAG testing unit connector provides connections with the MCHs and the AMCs in a star topological connection manner.

Besides the above star topological connection, the JTAG testing unit connector may provide connections in a connection manner of mixing a bus with a star topology. In this case, the JTAG testing unit includes a test bus controller. This circumstance is demonstrated in the following by, for example, setting a JTAG testing unit connector in a full-height double-width AMC slot.

Figure 7:
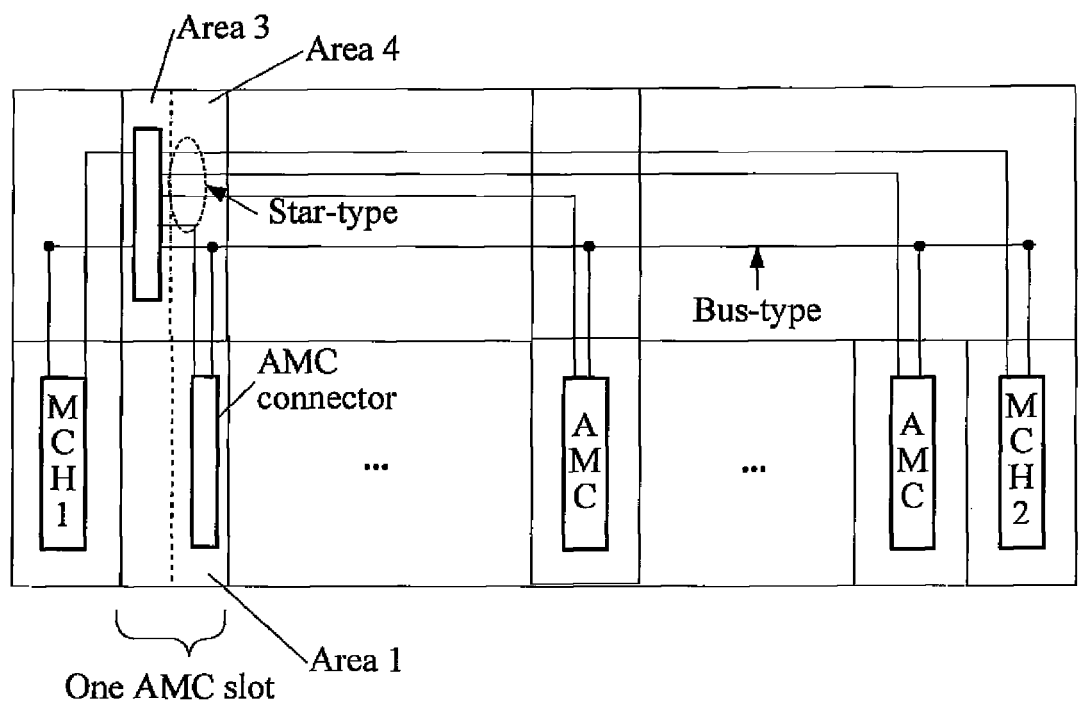
FIG. 7 is another connection relationship diagram according to an embodiment of the present invention.
Figure 8:
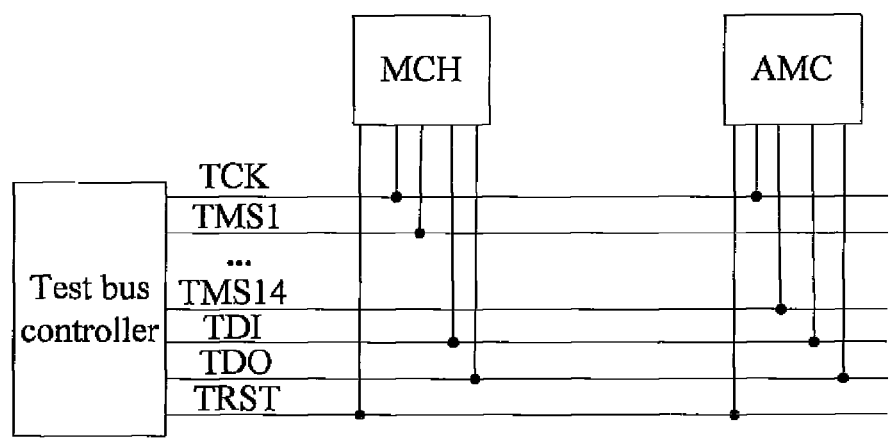
FIG. 8 is a schematic topological connection diagram of a JTAG testing unit connector according to an embodiment of the present invention.

FIG. 7 is another connection relationship diagram according to an embodiment of the present invention. As shown in FIG. 7, a JTAG testing unit connector is set in an area 3 of the full-height double-width AMC slot. The JTAG testing unit connector provides connections to the MCHs and the AMCs in a bus topological manner, but some ports also adopt the star topological connection. The specific port connections are shown in FIG. 8. A TCK connection, TRST connection, TDI connection, and TDO connection of a test bus controller may adopt a bus manner. Correspondingly, a TCK port, TRST port, TDI port, and TDO port of the JTAG testing unit connector may provide bus-type connections. However, during the JTAG test, each to-be-tested unit does not have a function of listening on a backplane test bus, and fails to detect an addressing signal, so that a test mode of each to-be-tested unit may be set only through a TMS signal. Therefore, the connections between the TMS ports and the MCHs and the AMCs provided by the test bus controller need to adopt a point-to-point star topological connection.

In the embodiment shown in FIG. 7, the JTAG control unit for controlling the JTAG testing unit may be set in the MCHs, or may be realized through an external test tool. The load power connection provided by the test bus controller may be directly supplied by the load power connection for the MCHs. That is, when the PM powers on the MCHs, the load power connection provided for the MCHs may be used to power on the test bus controller at the same time.

Figure 9:
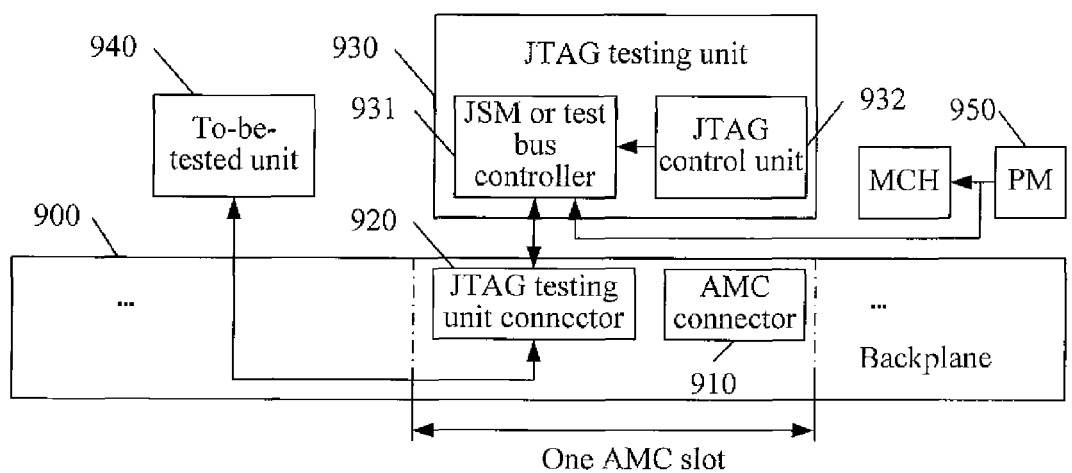
FIG. 9 is a schematic construction diagram of a MicroTCA system according to an embodiment of the present invention.

The method for expanding a MicroTCA provided according to an embodiment of the present invention has been described above in detail. The MicroTCA system provided according to the embodiment of the present invention may be described below. As shown in FIG. 9, the MicroTCA system mainly includes at least one AMC slot on a backplane 900, and the at least one AMC slot is set with an AMC connector 910 and a JTAG testing unit connector 920 therein.

The JTAG testing unit connector 920 may be set in an area outside the AMC connector 910 in the at least one AMC slot on the backplane 900, which may adopt the specific configuration manners as shown in FIGS. 4a, 4b, and 4c.

The system may further include a JTAG testing unit 930.

The JTAG testing unit 930 performs a test on the MicroTCA system through the JTAG testing unit connector 920, for example, testing a to-be-tested unit 940.

The to-be-tested unit 940 may be an AMC connected to the JTAG testing unit 930 through the AMC connector, or may be a PM.

The JTAG testing unit 930 includes a JSM or test bus controller 931 and a JTAG control unit 932.

The JSM or test bus controller 931 is configured to perform a JTAG test on the to-be-tested unit 940.

The JTAG control unit 932 is configured to manage and control the JSM or test bus controller 931 to complete the JTAG test.

When the JTAG testing unit and the to-be-tested unit adopt a star topology structure, the JSM may be adopted. When the JTAG testing unit and the to-be-tested unit adopt a topology structure of mixing a start-type connection with a bus-type connection, the test bus controller may be adopted.

The JTAG control unit 932 may be set in an MCH of the MicroTCA system, or may be an external test tool of the MicroTCA system.

The connection between the JTAG testing unit 930 and the to-be-tested unit 940 provided by the JTAG testing unit connector 920 may be a star topological connection, and the JSM 931 of the JTAG testing unit 930 is located at a center of the star topological connection. If the JTAG control unit 932 is set in two MCHs, the JSM 931 is connected to the two MCHs in a point-to-point star topological connection, and is connected to the to-be-tested unit 940 in a similar point-to-point star topological connection. The connection between the JTAG testing unit 930 and the to-be-tested unit 940 provided by the JTAG testing unit connector 920 may be a start-type and bus-type topological connection. The connection between the TSM port and the to-be-tested unit 940 provided by the JTAG testing unit 930 is a point-to-point star topology connection, and the connections between the other ports and the to-be-tested unit and the MCH may be bus-type topological connections. The specific connections are shown in FIGS. 7 and 8.

The MicroTCA system may further include a PM 950 configured to power on the JTAG testing unit 930 by using the load power supplied to the MCH.

As seen from the above descriptions, in the method and system provided according to the embodiments of the present invention, on a backplane of a MicroTCA system, an AMC connector and a JTAG testing unit connector are set into at least one AMC slot. Setting the JTAG testing unit connector by using the existing AMC slot prevents occupying exclusive backplane space by setting another JTAG slot, and thus saves backplane space. Furthermore, after the test is completed, an AMC can be further plugged in and the normal use of the AMC is not affected.

Furthermore, an embodiment of the present invention provides a topological connection of mixing a star-type connection with a bus-type connection between the JTAG testing unit and the to-be-tested unit and the MCH, which is connected to the star topological connection in the prior art, thereby simplifying the wring intensity of the backplane.

Through the above description of the embodiments, it is apparent to persons skilled in the art that the present invention may be accomplished by hardware, and may also be accomplished by combining software with a necessary universal hardware platform. Based on this, the technical solution of the present invention can be substantially embodied in the form of a software product. The software product is stored in a nonvolatile storage medium (such as a CD-ROM, USB flash drive, or mobile hard disk), and contains several instructions to instruct computer equipment (such as a personal computer, a server, or network equipment) to perform the method as described in the embodiments of the present invention.

The above descriptions are merely exemplary embodiments of the present invention, but not intended to limit the present invention. Any modification, equivalent replacement, and improvement made without departing from the spirit and principle of the present invention shall fall within the protection scope of the present invention.

What is claimed is:

1. A ethod for expanding micro telecom computing architecture (MicroTCA), comprising:
setting an advanced mezzanine card (AMC) connector and a joint test action group (JTAG) testing unit connector into an AMC slot on a backplane of a MicroTCA system, wherein the AMC connector is configured to receive an AMC and the JTAG testing unit connector is configured to receive a JTAG testing unit enabling the AMC to be plugged into the AMC connector within the AMC slot after testing is completed.

2. The method according to claim 1, wherein the JTAG testing unit connector is set in an area outside the AMC connector.

3. The method according to claim 1, wherein a JTAG control unit for controlling the JTAG testing unit is set in a MicroTCA Carrier Hub (MCH) of the MicroTCA system, or a controlling function of the JTAG control unit is realized through an external test tool.

4. The method according to claim 1, wherein the JTAG testing unit connector provides connections to to-be-tested units and the MCH in the MicroTCA system in a star topology manner, the JTAG testing unit comprises a JTAG switch module (JSM); or the JTAG testing unit connector provides connections to to-be-tested units and the MCH in the MicroTCA system in a manner mixing star topology and bus topology, the JTAG testing unit comprises a test bus controller.

5. The method according to claim 4, wherein the manner mixing star topology and bus topology comprises:

a TSM port of the JTAG testing unit connector provides connections to the to-be-tested units and the MCH in the MicroTCA system in a star topology; and other ports of the JTAG testing unit connector provides connections to the to-be-tested units and the MCH in the MicroTCA system in a bus topology.

6. The method according to claim 1, wherein load power of the JTAG testing unit connector is provided by load power of the MCH in the MicroTCA system.

7. A micro telecom computing architecture (MicroTCA) system, comprising:

an advanced mezzanine card (AMC) slot on a backplane;
an AMC connector set within the AMC slot; and
a joint test action group (JTAG) testing unit set within the AMC slot.

8. The system according to claim 7, further comprising:
a JTAG testing unit, configured to test the MicroTCA system through the JTAG testing unit connector.

9. The system according to claim 8, wherein the JTAG testing unit comprises:

a JTAG control unit and a JTAG switch module (JSM) or test bus controller;
the JSM or test bus controller is configured to perform a JTAG test on a to-be-tested unit in the MicroTCA system; and
the JTAG control unit is configured to manage and control the JSM or test bus controller to perform the JTAG test.

10. The system according to claim 7, wherein the JTAG testing unit connector is set in an area outside the AMC connector.

11. A method for testing a micro telecom computing architecture (MicroTCA) system, comprising:

plugging a JTAG switch module (JSM) into a advanced mezzanine card (AMC) slot on a backplane of the MicroTCA system, wherein the AMC slot includes an AMC connector and a joint test action group (JTAG) testing unit connector within an area defined by the AMC slot;

testing a to-be-tested unit in the MicroTCA system; and removing the JSM after testing, and plugging an AMC into the AMC slot for normal use.

12. The method according to claim 11, wherein a JTAG control unit for controlling the JTAG testing unit is set in a MicroTCA Carrier Hub (MCH) of the MicroTCA system, or a controlling function of the JTAG control unit is realized through an external test tool.

13. The method according to claim 11, wherein the JTAG testing unit connector provides connections to to-be-tested units and the MCH in the MicroTCA system in a star topology manner, the JTAG testing unit comprises a JTAG switch module (JSM).

14. The method according to claim 1, wherein load power of the JTAG testing unit connector is provided by load power of the MCH in the MicroTCA system.

15. A micro telecom computing architecture (MicroTCA) system, comprising:

a plurality of advanced mezzanine card (AMC) slots on a backplane, each of the AMC slots defining a slot area;

an AMC connector set within a first one of the plurality of AMC slots, the AMC connector disposed within a first area of the slot area; and a joint test action group (JTAG) testing unit connector set within the first one of the plurality of AMC slots, the JTAG testing unit connector disposed within a second area of the slot area.

16. The MicroTCA system in accordance with claim 15 wherein the first one of the plurality of AMC slots is configured to: receive a JTAG testing unit without an AMC disposed therein for testing, and receive the AMC without the JATG testing unit disposed therein for normal use.

* * * * *

UNITED STATES PATENT AND TRADEMARK OFFICE
CERTIFICATE OF CORRECTION

PATENT NO. : 8,601,320 B2  
APPLICATION NO. : 12/813368  
DATED : December 3, 2013  
INVENTOR(S) : Shanfu Li et al.

Page 1 of 1

It is certified that error appears in the above-identified patent and that said Letters Patent is hereby corrected as shown below:

Claims

Column 6, Claim 1, line 53, delete "ethod" and insert -- method --.

Signed and Sealed this  
Ninth Day of February, 2016

Michelle K. Lee  
*Director of the United States Patent and Trademark Office*